US007693803B1

(12) United States Patent
Leon et al.

(10) Patent No.: US 7,693,803 B1
(45) Date of Patent: Apr. 6, 2010

(54) HYBRID POSTAGE PRINTER SYSTEMS AND METHODS

(75) Inventors: J. P. Leon, Marina del Rey, CA (US); Keith Bussell, Los Angeles, CA (US)

(73) Assignee: Stamps.com Inc., Los Angeles, CA (US)

( * ) Notice: Subject to any disclaimer, the term of this patent is extended or adjusted under 35 U.S.C. 154(b) by 815 days.

(21) Appl. No.: 11/324,180

(22) Filed: Dec. 30, 2005

(51) Int. Cl.
*G06F 17/00* (2006.01)
*G07B 17/02* (2006.01)

(52) U.S. Cl. ...................................................... 705/408
(58) Field of Classification Search .................. 705/408
See application file for complete search history.

(56) References Cited

U.S. PATENT DOCUMENTS 3,194,946 A 7/1965 Rabino et al.
3,867,882 A 2/1975 Ahlgren et al.
4,511,907 A * 4/1985 Fukuchi ....................... 347/12
4,620,807 A * 11/1986 Polit ........................... 400/56
5,094,554 A * 3/1992 Hurd et al. ..................... 400/59
5,101,224 A 3/1992 Freed, Jr.
5,156,467 A 10/1992 Kitahara et al.
5,239,316 A * 8/1993 Demarchi et al. ............. 347/33
5,290,348 A * 3/1994 Auslander ................ 106/31.15
5,308,173 A 5/1994 Amano et al.
5,606,507 A 2/1997 Kara
5,717,597 A * 2/1998 Kara .......................... 705/408
5,930,796 A * 7/1999 Pierce et al. ................ 707/100
6,005,945 A 12/1999 Whitehouse
6,010,156 A * 1/2000 Block ............................ 281/2
6,048,048 A * 4/2000 Gregoire ....................... 347/40
6,079,327 A 6/2000 Sarada
6,106,095 A * 8/2000 Jackson et al. ................ 347/19
6,175,826 B1 * 1/2001 Malandra et al. ............ 705/410
6,208,980 B1 * 3/2001 Kara .......................... 705/408
6,385,731 B2 5/2002 Ananda
6,474,882 B1 11/2002 Vaghi
6,487,444 B2 * 11/2002 Mimura ...................... 600/544
2001/0024586 A1 9/2001 Day et al.
2001/0043350 A1 * 11/2001 Kasai et al. ................ 358/1.13
2002/0040333 A1 * 4/2002 Fuwa .......................... 705/27
2002/0040353 A1 4/2002 Brown et al.
2003/0074324 A1 4/2003 Kresina et al.

OTHER PUBLICATIONS

Business Wire, May 1, 2002, "Neopost Unveils Latest Self-Service Postage Kiosk and the High-Powered IJ105 Digital Mailing Machine at Mailcom-Visit Booth #601 To View Leading Mailing, Addressing, Document Handling and Logistics Systems.".*

* cited by examiner

*Primary Examiner*—John W Hayes
*Assistant Examiner*—Allen J Jung
(74) *Attorney, Agent, or Firm*—Fulbright & Jaworski L.L.P.

(57) ABSTRACT

Systems and methods which implement hybrid postage printer technology are shown. Embodiments provide a postage printing apparatus having a printable area larger than that associated with a postage meter stamp printed thereby and which can accommodate a variety of mail item and other media sizes. Embodiments employ a movable platen to accommodate various media thicknesses. Embodiments accommodate any size mail item or other media using a "C" configuration to allow a mail item or other media to extend beyond the print mechanism in at least three directions. According to an embodiment, the postage printer includes a web browser for hosting postage generation client software and to communicate with a postage generation server via the Internet or other network. Embodiments utilize a commercially available ink cartridge filled with a ink unique to postage metering applications and one or more color ink cartridges.

58 Claims, 3 Drawing Sheets

HYBRID POSTAGE PRINTER SYSTEMS AND METHODS

CROSS-REFERENCE TO RELATED APPLICATIONS

The present application is related to co-pending and commonly assigned U.S. patent application Ser. No. 11/323,462, entitled "High Speed Printing," filed Dec. 30, 2005; U.S. patent application Ser. No. 11/324,181, entitled "Hybrid Postage Printer Systems and Methods," filed Dec. 30, 2005; U.S. patent application Ser. No. 11/323,455, entitled "Hybrid Postage Printer Systems and Methods," filed Dec. 30, 2005; U.S. patent application Ser. No. 10/606,579, entitled "System and Method for Automatically Processing Mail," filed Jun. 26, 2003; and U.S. patent application Ser. No. 10/696,221 entitled "System and Method for Printing an Application of Dynamically Valued Stamps," filed Oct. 29, 2003, the disclosures of which are hereby incorporated herein by reference.

TECHNICAL FIELD

The present invention relates generally to postage printers and, more particularly, to postage printers adapted to provide enhanced postage printing features.

BACKGROUND OF THE INVENTION

Postage meters or franking devices have been in widespread use for many years. Such meters have traditionally been provided as a dedicated apparatus or "closed" system imprinting a postage indicium on postal items. U.S. Pat. No. 3,194,946 shows one example of a closed metering system.

In more recent years, the concept of an "open" metering system has been developed which utilizes a general purpose processor-based system, such as a personal computer system, operable under control of an instruction set defining operation as a postage metering apparatus. U.S. Pat. Nos. 5,606,507 and 6,385,731, the disclosures of which are incorporated herein by reference, show examples of open metering systems.

Closed metering systems have generally been relatively easy to operate, requiring only that the user insert a mail piece or label, set a desired amount of postage, and activate the printing mechanism to obtain a postage meter stamp. However, closed metering systems suffer from an inability to perform additional functions, not being flexible with respect to a user's changing needs or accommodating upgrades as new technologies develop, and being limited in the size and what can be printed as or with the postage meter stamp.

For example, even the more modern closed metering systems which print information based postage indicia provide a print area limited to a single corner of an envelope or other media. Specifically, such closed meter systems generally implement ink nozzle (often referred to as ink jet) print cartridge technology which provides for an approximately 0.5 inch print width. This ink cartridge is often mounted on a carriage which allows approximately 2 inches of movement along an X axis. The carriage itself is movable along a Y axis to accommodate two-pass printing by the ink cartridge to "stitch" together an image twice as wide as the ink cartridge print width (e.g., providing a print form factor of approximately 1 inch along the Y axis by approximately 2 inches along the X axis).

In contrast to closed metering systems, open metering systems utilize general purpose systems which may be used to perform many functions in addition to postage metering. Moreover, open metering systems may typically be upgraded to include new features and new technologies by a simple software upgrade and/or addition of peripheral components. Many open metering technologies, such as that provided by Stamps.com, Santa Monica, Calif., implement an Internet architecture, facilitating enhanced services such as address verification, online delivery notification, etcetera. Open metering systems have generally utilized general purpose printers, such as laser printers or ink nozzle (often referred to as ink jet) printers, and thus provide flexibility in the size and content of what is printed as or with the postage meter stamp.

Many closed meter users have been reluctant to adopt the open metering technology despite advantages in flexibility associated therewith. For example, a traditional closed meter user expects to simply input a postage amount and print a postage meter stamp without the need to interface with a general purpose computer and its attendant software etcetera. Because the printers used in open metering systems are often general purpose printers, a traditionally closed meter user may experience difficulty in properly orienting and inserting an envelope for printing. Moreover, the closed meter user typically applies a postage meter stamp to a completed mail item (e.g., an envelope stuffed with one or more documents) which cannot be accommodated by general purpose printers. However, many open meter users prefer the use of open metering technology in order to obtain benefits such as the ability to print various configurations of postage meter stamps, the ability to print information (e.g., addressor address, addressee address, message, advertising logo, etcetera) in association with postage meter stamps, and various value added services (e.g., address verification, online delivery confirmation, detailed account activity analysis and reporting, etcetera).

BRIEF SUMMARY OF THE INVENTION

The present invention is directed to systems and methods which implement hybrid postage printer technology. Embodiments of the present invention provide a postage printing apparatus having a printable area larger than that associated with a postage meter stamp printed thereby and which can accommodate a variety of mail item and other media sizes as well as accommodating complete mail items (e.g., an envelope which is stuffed with documents to be posted). A postage printing apparatus provided according to an embodiment of the present invention is adapted to print information based postage indicia and associated information, graphics, and/or images, such as addressor address, addressee address, message, advertising logo, photos, etcetera.

A preferred embodiment of the present invention comprises a postage printer having a media feed mechanism for moving a mail item or other media past a print head thereof along a Y axis. The print head itself is provided substantial movement (e.g., approximately 5-8.5 inches) along an X axis. Accordingly, such an embodiment may provide a print form factor of approximately 5-8.5 inches along the X axis and limited only by the mail item or other media along the Y axis.

In order to accommodate varying thicknesses of mail items, such as an empty envelope and an envelope stuffed with one or more documents, for printing postage, embodiments of the invention employ a platen which is movable along a Z axis. According to one embodiment, the aforementioned feed mechanism for moving a mail item or other media past a print head comprises a conveyer mechanism, such as one or more feed belts, providing controlled movement of the media along the Y axis. This feed mechanism is preferably disposed upon the aforementioned movable platen. The platen is provided movement along the Z axis by members pivotally attached thereto, such as may be spring biased to encourage media toward the print head, according to embodiments of the invention.

Embodiments of the invention are adapted to accommodate any size mail item or other media. According to a preferred embodiment, a postage printer mechanism is provided in a "C" configuration to accommodate a mail item or other media extending beyond the print mechanism in at least three directions (e.g., front, back, and one side). A preferred embodiment provides a postage printer configuration in which a print head and carriage assembly are disposed above the print media, a platen is disposed below the print media, and a support member coupling the carriage assembly and platen is disposed on a side of the print media, thereby forming a print mechanism having a C configuration.

Postage printers of embodiments of the present invention may interface with a general purpose processor-based system, such as a personal computer, to provide a desired postage metering system. For example, a personal computer system may operate under control of postage generation client software, such as that available from Stamps.com, Santa Monica, Calif., to communicate with a postage generation server, such as that provided by Stamps.com, via the Internet or other network in order to generate a desired information based postage indicium and associated information (e.g., addressor address, addressee address, message, logo, photo, etcetera). The postage generation client software may communicate with the postage printer to control printing of the information based postage indicium and associated information on a mail item or other media.

Additionally or alternatively, postage printers of embodiments of the present invention may operate independent of a user host system, such as the aforementioned personal computer system. For example, a postage printer of embodiments of the invention includes processor-based logic for executing instructions to control generation and printing of information based postage indicia without interaction with a user host computer. According to an embodiment of the invention, the postage printer includes a web browser for hosting postage generation client software and to communicate with a postage generation server via the Internet or other network in order to generate and print a desired information based postage indicium and associated information. The aforementioned web browser may additionally or alternatively be used for functions such as purchasing postage value, managing an account, obtaining detailed account activity information, download software/firmware updates, etcetera.

Embodiments of the invention provide a configurable or modular postage printer configuration. For example, a base postage printing mechanism may be provided which may interface with the aforementioned user host system for printing postage. However, modules, such as a touch screen user interface module and a postal scale module, may be interfaced with the base postage printing mechanism (e.g., using a universal serial bus (USB) or other interface) to provide desired functionality. A touch screen user interface module may be coupled to the base postage printing mechanism to facilitate its use independent of a user host system. A postal scale module may be coupled to the base postage printing mechanism, with or without a user host system attached thereto, to facilitate automatic postage calculations.

Preferred embodiments of a postage printer provided according to embodiments of the present invention implement ink nozzle printer technology, such as to utilize commercially available ink nozzle printer ink cartridge technology. Embodiments of the invention utilize a commercially available ink cartridge filled with a ink unique to postage metering applications, such as a red or black fluorescent ink. Moreover, embodiments utilize a multiple ink cartridge configuration, such as to include the aforementioned postage metering ink cartridge and one or more color ink cartridges, such as a multi-color photo ink cartridge for printing photo stamps.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
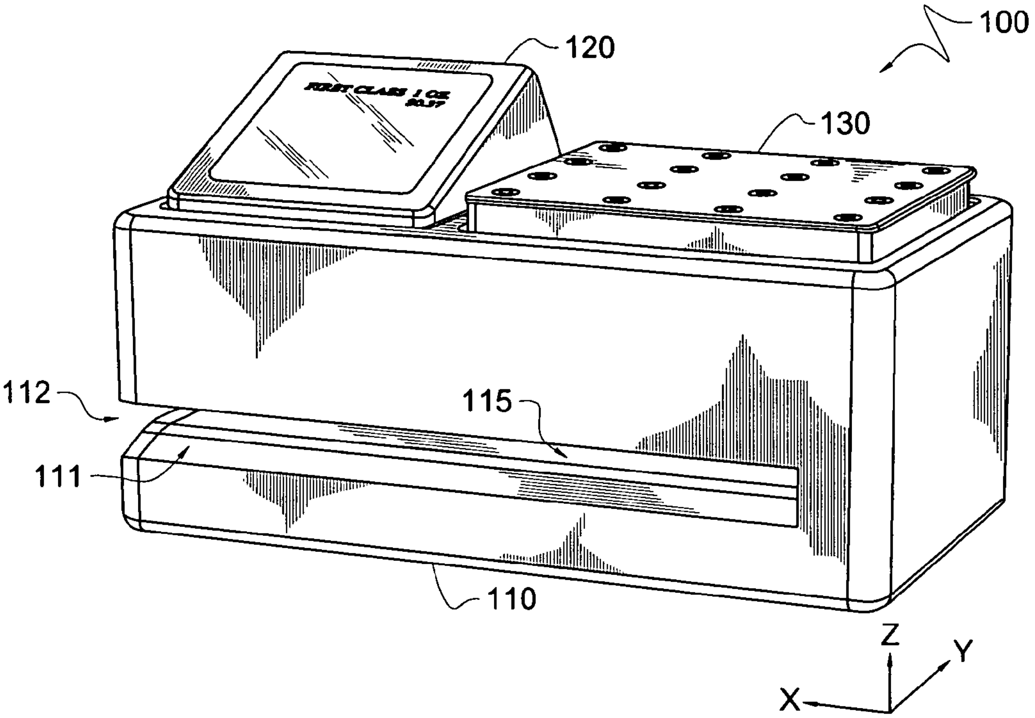
FIGS. 1A and 1B show a postage printer adapted according to an embodiment of the present invention.
Figure 1B:
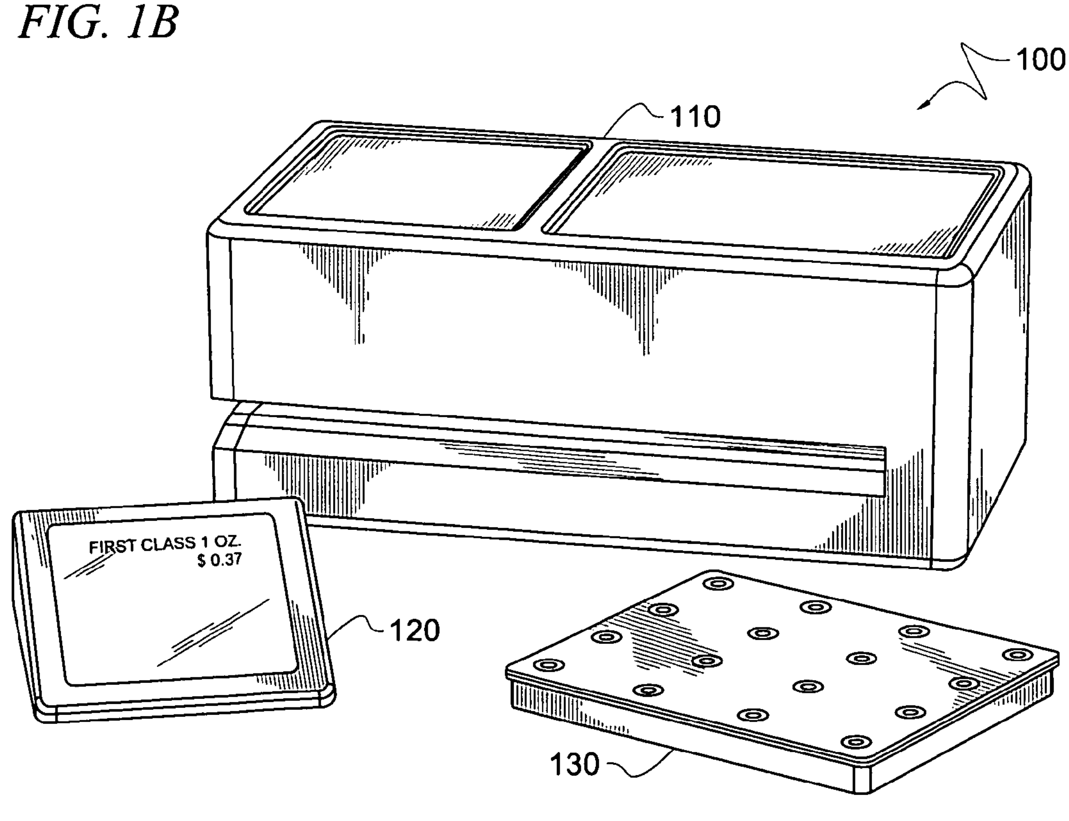

FIGS. 1A and 1B show a postage printer adapted according to an embodiment of the present invention. Postage printer 100 of FIGS. 1A and 1B includes base postage printing mechanism 110, user interface module 120, and scale module 130. As can be seen in FIG. 1B, postage printer 100 of the illustrated embodiment is provided in a modular configuration such that user interface module 120 and/or scale module 130 may be added or removed from base postage printing mechanism 110 depending upon whether the features thereof are desired.

According to a preferred embodiment of the invention, base postage printing mechanism 110 comprises printer technology adapted to accept postal items and other media of various sizes and thicknesses and to print information based postage indicium and/or other information (whether text, graphics, or photos) thereon. Accordingly, base postage printing mechanism 110 is shown in FIGS. 1A and 1B having a C configuration.

Specifically, base postage printing mechanism 110 of the illustrated embodiment includes front opening 111, side opening 112, and a back opening (not shown) corresponding to front opening 111 to accommodate any size of media. Additionally or alternatively, platen and media feed assembly 115 of base postage printing mechanism 110 is movable along the Z axis to accommodate various thicknesses of media and to encourage the media toward one or more print heads of the preferred embodiment, as will be discussed in further detail below. Platen and media feed assembly 115 of embodiments includes media handling members, such as may comprise a conveyer mechanism having one or more feed belts, providing controlled movement of the media along the Y axis.

Base postage printing mechanism 110 of embodiments includes a print head carriage mechanism providing movement along the X axis to one or more print heads of base postage printing mechanism 110. The print head is preferably provided substantial movement (e.g., approximately 5-8.5 inches) along the X axis. Because base postage printing mechanism 110 of the illustrated embodiment provides media openings at both the front and back, printing upon such media along the Y axis is unlimited. Accordingly, the illustrated embodiment may provide a print form factor of approximately 5-8.5 inches along the X axis and limited only by the mail item or other media along the Y axis. Embodiments of the invention may, therefore, print information based postage indicia accompanied by addressee and/or addressor address, shipping labels with or without postage indicia, sheets of multiple stamps, bills of lading, and/or the like.

User interface module 120 shown in FIGS. 1A and 1B preferably provides a touch screen user interface removeably coupled to base postage printing mechanism 110. For example, user interface module 120 may interface with base postage printing mechanism 110 for information communication via a serial (e.g., USB) interface, a network interface, a parallel interface, a wireless interface, an infrared interface, etcetera. User interface module 120 may display information with respect to the operation of base postage printing mechanism 110, such as an operational status thereof various user options selected or offered for selection, postage information, postage amount, print preview, etcetera. Accordingly, user interface module 120 facilitates operation of base postage printing mechanism 110 as a postage metering system independent of a user host system according to embodiments of the invention.

Moreover, user interface module 120 of embodiments may be utilized with respect to enhanced services. For example, user interface module 120 may be utilized to input information, such as addressee information and/or addressor information for verification of the address and/or printing with a postage indicium, special delivery instructions (e.g., return receipt requested), a message for printing with a postage indicium, etcetera. User interface module 120 may be utilized to obtain information, such as detailed account activity analysis and reporting. User interface module 120 may additionally or alternatively be used to obtain postage value and/or other goods and services. For example, where postage printer 100 has a web browser associated therewith, user interface module 120 may be utilized to communicate with a server to pay for and obtain postage value, to order supplies, to report a fault and request service, etcetera.

Scale module 130 shown in FIGS. 1A and 1B preferably provides a scale removeably coupled to base postage printing mechanism 110. For example, scale module 130 may interface with base postage printing mechanism 110 for information communication via a serial (e.g., USB) interface, a network interface, a parallel interface, a wireless interface, an infrared interface, etcetera. Scale module 130 of embodiments weighs postal items and provides weight information to base postage printing mechanism 110, such as for automatic calculation of postage, completing a bill of lading, etcetera. It should be appreciated that scale module 130 may be utilized with other host systems, such as a user host personal computer system, if desired.

Figure 2:
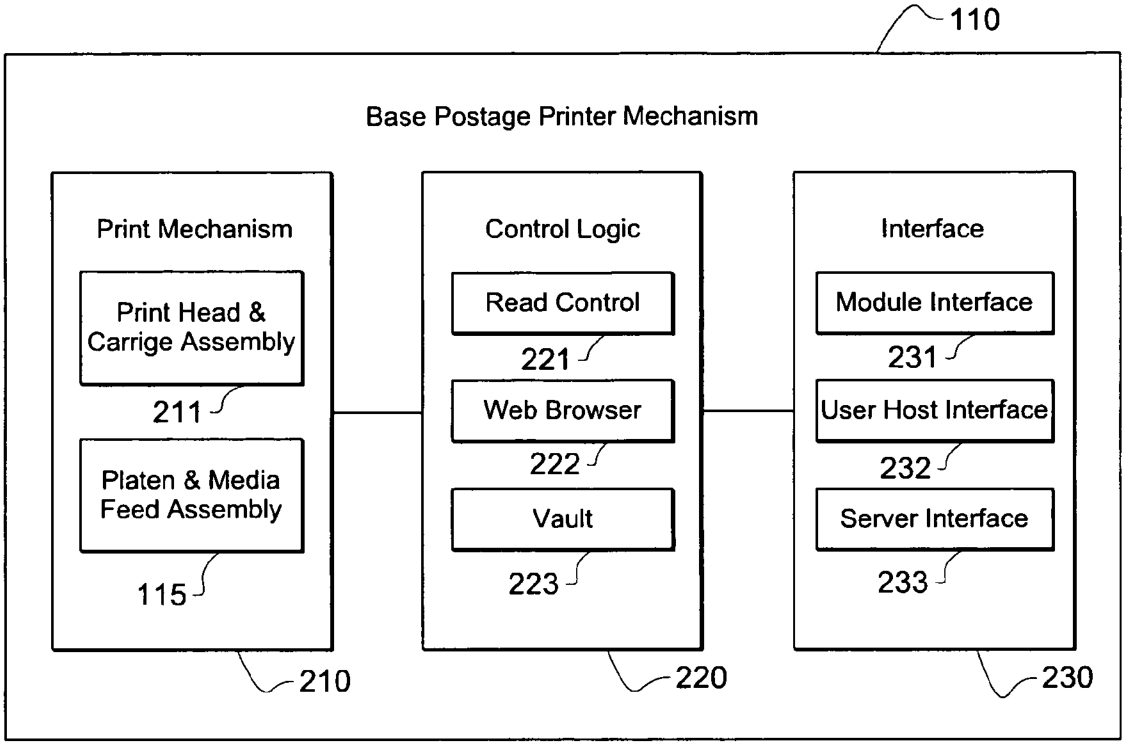
FIG. 2 shows a functional block diagram showing detail with respect to a base postage printer mechanism of an embodiment of the invention.

Directing attention to FIG. 2, a functional block diagram showing detail with respect to base postage printer mechanism 110 of an embodiment of the invention is shown. Base postage printer mechanism 110 of FIG. 2 includes print mechanism 210, control logic 220, and interface 230.

Print mechanism 210 of the illustrated embodiment includes print head and carriage assembly 211 and platen and media feed assembly 115. Print mechanism 210 preferably operates under control of control logic 220.

Print head and carriage assembly 211 of preferred embodiments comprises an ink nozzle print head carrier. For example, a print head and carriage assembly of an embodiment of the invention utilizes ink nozzle printer ink cartridge technology commercially available from vendors such as Hewlett Packard Company, Palo Alto, Calif., Cannon, U.S.A., Inc., Lake Success, N.Y., and U.S. Epson, Inc., Long Beach, Calif. Embodiments of the invention utilize a commercially available ink cartridge filled with a ink unique to postage metering applications, such as a red or black fluorescent ink. Moreover, embodiments utilize a multiple ink cartridge configuration, such as to include the aforementioned postage metering ink cartridge and one or more color ink cartridges, such as a multi-color photo ink cartridge for printing photo stamps.

It should be appreciated that ink cartridges of postage printers adapted according to embodiments of the present invention may be utilized for printing various information, objects, images, etcetera. For example, one or more color ink cartridges may be utilized in printing a postage indicia in addition to or in the alternative to printing images, such as photo quality images of a photo stamp. Moreover, such color ink cartridges may be utilized in printing human readable information, such as postage amount, meter stamp date, address information, etcetera. An ink cartridge having fluorescent ink may be used to print a facing mark, such as a facing identification mark (FIM) as are commonly used by the United States Postal Service (USPS), in addition to or in the alternative to printing postage indicia.

Platen and media feed assembly 115 of preferred embodiments is movable as described below to accommodate various thicknesses of media and includes media handling members providing controlled movement of the media relative to print head and carriage assembly 211. For example, embodiments of platen and medial feed assembly 115 are adapted to accommodate media thicknesses from a single sheet of paper to a postal item approximately 5/16ths of an inch thick. Further detail with respect to one embodiment of platen and media feed assembly 115 is shown in FIG. 3.

Figure 3:
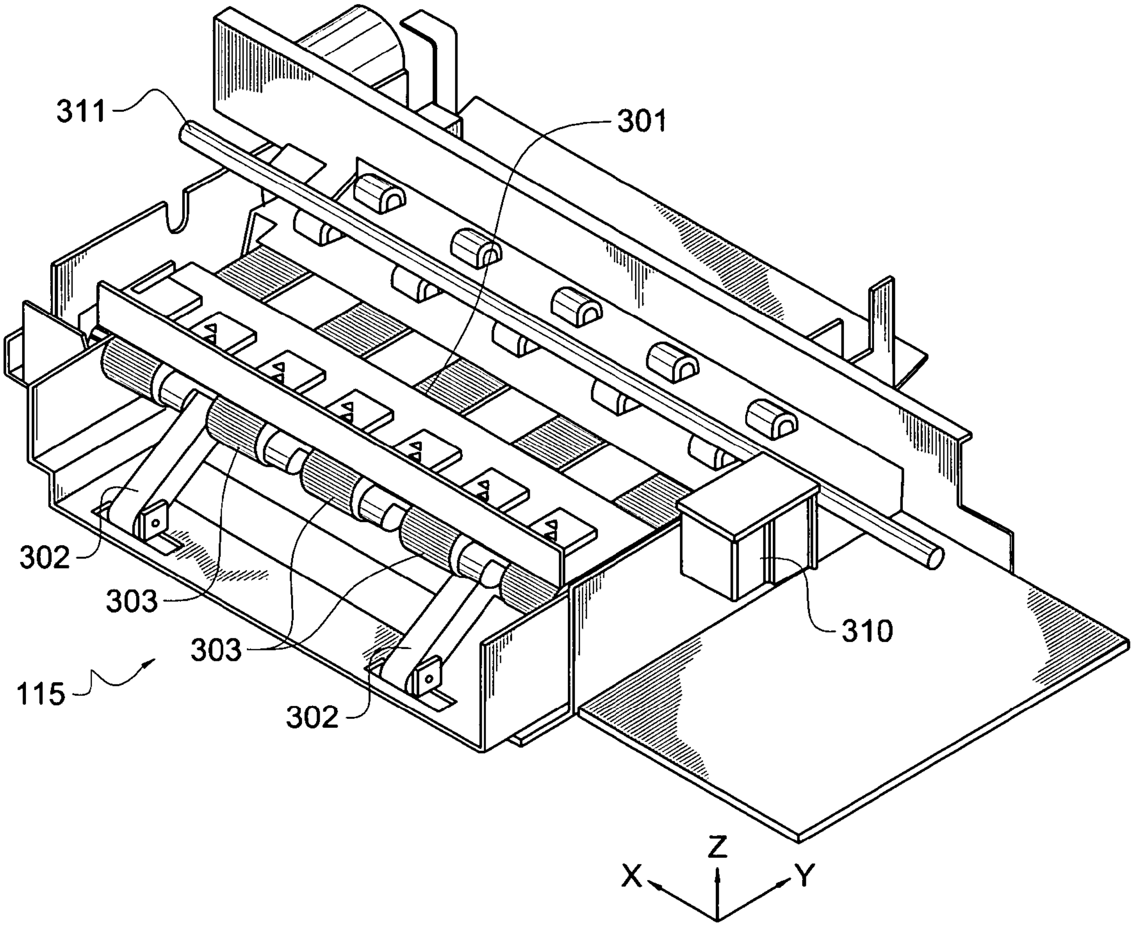
FIG. 3 shows detail with respect to one embodiment of platen and media feed assembly of a postage printer adapted according to an embodiment of the present invention.

Platen and media feed assembly 115 shown in FIG. 3 includes platen 301, lift members 302 pivotally attached to platen 301, and conveyer belts 303 disposed across a surface of platen 301. Platen 301 support a postal item or other media during printing. Lift members 302, such as may be biased by springs (not shown), provide a lifting force to encourage platen 301 and any media thereon toward a print head of ink cartridge 310 (along the Z axis). Conveyer belts 303 provide relative motion (along the Y axis) with respect a print head of ink cartridge 310 to media disposed on platen 301. In operation, ink cartridge 310, and a print head associated therewith, is moved back and forth (along the X axis) across carriage bar 311. This movement of the print head in association with the relative movement of the media being printed upon provides two dimensional (X-Y) printing. The movement of platen 301 along the Z axis accommodates postal items and media of varying thicknesses within print mechanism 210.

Referring again to FIG. 2, control logic 220 of the illustrated embodiment includes print control 221, web browser 222, and vault 223. Control logic 220 preferably comprises a processor, such as a PENTIUM microprocessor available from Intel, Santa Clara, Calif., or a POWERPC microprocessor available from Motorola, Schaumburg, Ill., and a memory, such as random access memory (RAM), read only memory (ROM), flash memory, magnetic memory, optical memory, etcetera, storing an instruction set or sets providing print control and/or web browser functionality.

Figure 4A:
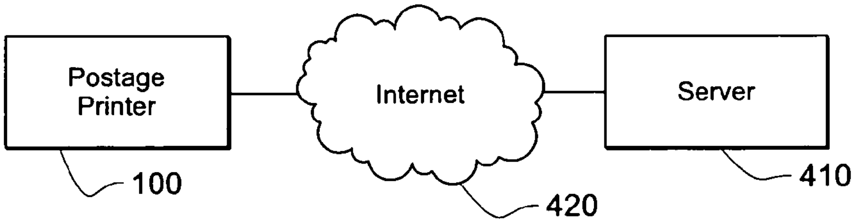
FIGS. 4A and 4B show connectivity of a postage printer of embodiments of the present invention.

Print control 221 of embodiments operates to control print mechanism 210 to print information based postage indicia and associated information. For example, in a configuration adapted for operation independent of a user host system (e.g., having user interface module 120 coupled thereto), print control 221 may solicit postage information from a user (e.g., postage amount, postage class, special delivery instructions, addressor address, addressee address, size of postal item, and/or the like), operate to generate an information based postage indicium, and control print mechanism 210 to print the information based postage indicium, perhaps in combination with printing other information. Interfacing with the user to solicit information and/or provide information to the user by print control 221 may utilize web browser 222. Generation of the information based postage indicia may include use of interface 230 to communicate with a server (e.g., server 410 of FIG. 4A) or other system via a network (e.g., Internet 420 of FIG. 4A) for verifying address information, for obtaining postage value (such as may be stored in vault 223), for providing postage information and receiving postage indicia data in return, etcetera. It should be appreciated that the foregoing postage printer configuration adapted for operation independent of a user host system provides a postage meter printer having more traditional meter operation while utilizing open metering system backend functionality to provide robust features and enhanced services.

Figure 4B:
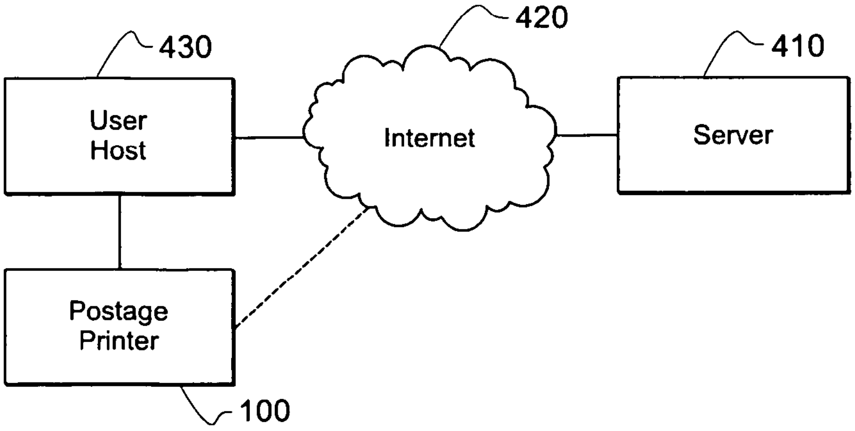

Embodiments of base postage printer mechanism 110, however, may operate as a part of a postage printing system in which a user host system (e.g., user host 430 of FIG. 4B) interfaces with a user and/or a server (e.g., server 410 of FIG. 4B) or other system provides postage value, postage indicia data, address verification, etcetera. It should be appreciated that postage printer 100 of such embodiments may communicate with the foregoing server or other system via a network (e.g., Internet 420 of FIG. 4B) through the user host system or directly (as represented by the dotted line in FIG. 4B).

Web browser 222 of embodiments provides an intuitive user interface consistent with web browsers widely available on a number of devices, such as personal computers, cellular telephones, personal digital assistants (PDAs), etcetera. Web browser 222 of embodiments facilitates user navigation of internal functions, such as those provided by print control 221, and external functions, such as those provided by server 410. For example, a user may utilize web browser 222 to input a desired amount of postage to print and to control printing of an information based postage indicium by postage printer 100. Additionally or alternatively, a user may utilize web browser 222 to purchase postage value from server 410, to order supplies such as additional ink cartridges from a supplier, etcetera. Accordingly, embodiments of postage printer 100 provide an Internet appliance configuration.

Vault 223 of embodiments operates to security store postage meter related data. For example, vault 223 may store postage value to facilitate operation of postage printer 100 without communicating with a server or other host. Additionally or alternatively, vault 223 may store data such as an ascending register, a descending register, a meter number, an electronic serial number, cryptographic keys, a digital certificate, and/or the like. Vault 223 may comprise any suitably secure memory, such as a touch memory utility button available from Dallas Semiconductor Corporation, Dallas, Tex., a PCMCIA card, secure digital card, etcetera.

Interface 230 of the illustrated embodiment includes module interface 231, user host interface 232, and server interface 233. Interface 230 preferably facilitates communications between control logic 220 and other systems, such as systems external to base postage printer mechanism 110.

Module interface 231 of embodiments provides a communication interface for coupling modules, such as user interface module 120 and scale module 130, to control logic 220. User host interface 232 of embodiments provides a communication interface for coupling a user host system, such as a personal computer system, to control logic 220. Server interface 233 of embodiments provides a communication interface for coupling a server or other external system, such as a remote postage server, to control logic 220. Accordingly, any of module interface 231, user host interface 232, and server interface 233 may comprise a serial (e.g., USB) interface, a network interface, a parallel interface, a wireless interface, an infra red interface, and/or the like.

It should be appreciated that, although a preferred embodiment has been described herein with reference to various functional blocks, embodiments of the present invention may not implement each of the described functional blocks and/or may implement additional or alternative functional blocks. For example, embodiments of the invention may omit vault 223 and/or one or more of module interface 231, user host interface 232, and server interface 233.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:

a general-purpose printing mechanism operable for printing postage indicia, said general-purpose printing mechanism having a print media opening open on at least three sides, a print head carriage mechanism providing controlled movement of a print head in a first direction while printing postage indicia, a media feed mechanism including:

a platen having at least one media feeder and at least one lift member coupled to said platen, wherein said media feeder provides controlled movement of media in a second direction and said lift member provides controlled movement of media in a third direction while printing said postage indicia; and a user interface module providing control of said general-purpose printing mechanism, wherein said user interlace module facilitates printing said postage by said general-purpose printing mechanism independently of a host computer.

2. The system of claim 1, wherein said general-purpose printing mechanism provides a printable area of at least 5 inches wide by up to a length of said media.

3. The system of claim 2, wherein said general-purpose printing mechanism provides a printable area of at least 8.5 inches wide.

4. The system of claim 1, wherein movement in said third direction accommodates different thicknesses of said media.

5. The system of claim 1, wherein said print head comprises a print head of an ink cartridge.

6. The system of claim 5, wherein said ink cartridge comprises a commercially available ink cartridge apparatus.

7. The system of claim 5, wherein said ink cartridge is filled with an ink uniquely configured for postage indicia printing.

8. The system of claim 7, wherein said ink comprises a fluorescent ink.

9. The system of claim 1, wherein said print head carriage mechanism provides controlled movement of at least two print heads.

10. The system of claim 9, wherein said at least two print heads comprise at least a first print head for printing a postal mark and at least a second print head for printing color images.

11. The system of claim 10, wherein said color images comprise photos.

12. The system of claim 10, wherein said color images are printed in association with said postage indicia.

13. The system of claim 1, wherein said postage indicia comprise an information based postage indicium.

14. The system of claim 1, wherein said media comprises a plurality of postage indicia printed by said print head in a same postage printing operation.

15. The system of claim 1, further comprising:

control logic for controlling operation of said print head carriage mechanism and said media feed mechanism to print said postage indicia independent of a user host system.

16. The system of claim 15, wherein said general-purpose printing mechanism is adapted to operate as a stand-alone postage meter.

17. The system of claim 15, wherein said general-purpose printing mechanism is adapted to operate as an Internet appliance postage meter.

18. The system of claim 15, wherein said control logic comprises:

a web browser.

19. The system of claim 18, wherein said web browser provides a user interface for controlling internal operations of said print mechanism.

20. The system of claim 18, wherein said web browser provides a user interface with systems external to said print mechanism.

21. The system of claim 18, further comprising:

a vault, wherein said web browser operates to download postage value to said vault.

22. A method comprising:

receiving a media, upon which a postage indicium is to be printed, into a print media opening of a postage printing mechanism, said print media opening being open on at least three sides;

controlling a platen coupled to at least one lift member and at least one media feed mechanism, wherein said platen supports said media against a print head, and wherein said lift member lifts said platen up to said print head, and wherein said media feed mechanism moves said media in a first direction while printing said postage indicium;

controlling said print head to move in a second direction while printing said postage indicium;

facilitating said printing using a removably coupled user interface module, wherein the user interface module operates independently of a host computer; and generating said postage indicium.

23. The method of claim 22, wherein said postage indicium comprises an information based postage indicium.

24. The method of claim 22, wherein said generating said postage indicia comprises:

communicating with a postage server system.

25. The method of claim 22, wherein said generating said postage indicium comprises:

using a web browser of said postage printing mechanism.

26. The method of claim 22, wherein said generating said postage indicia comprises:

a user directly inputting postage information into a user interface of said postage printing mechanism.

27. The method of claim 22, wherein said generating said postage indicia comprises:

a user inputting postage information into a user interface of a user host system coupled to said postage printing mechanism.

28. The method of claim 22, wherein said controlling said platen and said controlling said print head prints said postage indicium and information associated therewith.

29. The method of claim 28, wherein said information comprises at least one of an addressee address and an addressor address.

30. The method of claim 28, wherein said information comprises an image.

31. The method of claim 30, wherein said image comprises a photo.

32. The method of claim 28, wherein said print head comprises a first print head for printing said postage indicium and a second print head for printing said information.

33. The method of claim 32, wherein said first print head prints using a fluorescent ink.

34. The method of claim 33, wherein said second print head prints using multicolored ink.

35. The method of claim 22, wherein said lifting said platen up comprises:

moving said platen, including said lift member and said media feed mechanism, in a third direction to accommodate various thicknesses of said media.

36. The method of claim 35, wherein said first direction comprises movement along a Y axis, said second direction comprises movement along an X axis, and said third direction comprises movement along a Z axis.

37. The method of claim 22, wherein said media comprises a plurality of postage indicia printed in a same postage printing operation of said postage printing mechanism.

38. An apparatus for printing postage, said apparatus comprising:

a housing having a postal item media opening open on at least three sides, said postal item media opening adapted to receive postal item media for printing postal indicia thereon;

a print head carriage mechanism disposed within said housing, said print head carriage mechanism providing controlled movement of a prim head in a first direction for printing said postage indicia;

a media feed mechanism disposed within said housing, said media feed mechanism providing controlled movement of said postal item media in a second direction for printing said postage indicia; and said media feed mechanism being disposed on a platen having at least one lift member coupled to said platen, wherein said lift member provides controlled movement of said postal item media in a third direction while printing said postage indicia; and a removably coupled user interface module operating independently of a host computer, wherein said user interface module facilitates printing said postage by said apparatus independent of a host computer, wherein said postal item media opening enables receipt into said housing of at least a portion of a postal item having unrestricted width and unrestricted length for movement by said media feed mechanism to said print head for printing on said at least a portion of the received postal item.

39. The apparatus of claim 38, wherein said lift member provides controlled movement of said postal item media in a third direction to accommodate different thicknesses of said postal item media.

40. The apparatus of claim 38, wherein said print head comprises a print head of an ink cartridge.

41. The apparatus of claim 40, wherein said ink cartridge comprises a commercially available ink cartridge apparatus.

42. The apparatus of claim 38, wherein said print head of said print head carriage mechanism comprises a print head for printing color images.

43. The apparatus of claim 42, wherein said color images comprise photos.

44. The apparatus of claim 42, wherein said color images are printed in association with said postage indicia.

45. The apparatus of claim 38, wherein said postage indicia comprise an information based postage indicium.

46. The apparatus of claim 38, further comprising:

control logic for controlling operation of said print head carriage mechanism and said media feed mechanism to print said postage indicia independent of a user host system.

47. The apparatus of claim 46, wherein said apparatus comprises a stand-alone postage meter.

48. The apparatus of claim 46, wherein said apparatus comprises an Internet appliance postage meter.

49. The system of claim 1 wherein said print head carriage mechanism provides controlled movement of said print head to cause said print head to move over at least a portion of said media in said first direction and to cause said print head to move over at least a portion of said media in a direction opposite said first direction while printing postage indicia.

50. The method of claim 22 wherein the postage printing mechanism comprises a general-purpose printing mechanism that is operable to print information other than said postage indicium.

51. The apparatus of claim 38 wherein the apparatus comprises a general-purpose printing mechanism that is operable to print information other than said postage indicia.

52. A postage printing apparatus, said apparatus comprising:

a housing having a C configuration to accommodate a media received for printing thereon that extends beyond the housing in at least two directions along a first axis and in at least a third direction along a second axis, wherein said second axis is orthogonal to the first axis;

a print head and carriage assembly disposed above the received media;

a platen disposed below the received media, wherein said platen holds said media against said print head and is moveable orthogonal to a print plane of said print head accommodating media of varying thickness;

a support member coupling the carriage assembly and platen, said support member disposed on a side of the print media;

a media feed mechanism providing controlled movement of the received media to transport said received media to said print head for printing said postage thereon, wherein said media teed mechanism is disposed on said platen; and a user interface module facilitating printing of said postage, said user interface module operating independently of a host computer.

53. An apparatus for printing postage, said apparatus comprising:

a print head carriage mechanism disposed within a housing, said print head carriage mechanism providing controlled movement of a print head along an X axis while printing;

a media feed mechanism disposed within said housing, said media feed mechanism providing controlled movement of a received media along a Y axis while printing to said media, said Y axis being orthogonal to said X axis;

a platen disposed under said print head carriage mechanism supporting said media against said print head, wherein said media feed mechanism and at least one lift member is mounted on said platen, and wherein said lift member moves said platen along the Z axis accommodating media of various thickness;

a removably coupled user interface module operating independently of a host computer, wherein said user interface module facilitates use of said apparatus; and said housing having a media opening that is open on a front side and a back side of said housing to accommodate a length of said received media that extends along the Y axis beyond said housing, and said media opening open on a side of said housing to accommodate a width of said received media that extends along the X axis beyond said housing.

54. The apparatus of claim 53 wherein said media opening on said one side of said housing is open for an entirety of a path along which said media feed mechanism provides said controlled movement of the received media along the Y axis.

55. The apparatus of claim 54 wherein said media opening on said one side of said housing is open on said one side along an entirety of said housing along said Y axis to accommodate said received media that extends along the X axis beyond said housing on said one side to move along said Y axis from said opening on said front side to said opening on said back side.

56. The apparatus of claim 53, wherein said Z axis being orthogonal to a plane formed by said X axis and said Y axis.

57. The apparatus of claim 38 further comprising:

a removable scale coupled to said housing via a communications interface.

58. The apparatus of claim 53 further comprising:

a removable scale coupled to said housing via a communications interface.

* * * * *

UNITED STATES PATENT AND TRADEMARK OFFICE
CERTIFICATE OF CORRECTION

PATENT NO. : 7,693,803 B1
APPLICATION NO. : 11/324180
DATED : April 6, 2010
INVENTOR(S) : J P Leon et al.

It is certified that error appears in the above-identified patent and that said Letters Patent is hereby corrected as shown below:

On the Title page:

Item (75) Inventors: delete "J.P. Leon" and replace with --J P Leon--.

In the Claims:

Column 1, Claim 1, Line 64, delete the portion of text reading "user interlace" and replace with --user interface--.

Column 11, Claim 39, Lines 15-16, delete the portion of text reading "in a third" and replace with --in the third--.

Column 12, Claim 52, Line 11, delete the portion of text reading "media teed" and replace with --media feed--.

Signed and Sealed this

Eighteenth Day of May, 2010

David J. Kappos
*Director of the United States Patent and Trademark Office*